US008183942B2

(12) United States Patent
Le Prado et al.

(10) Patent No.: US 8,183,942 B2
(45) Date of Patent: May 22, 2012

(54) ATOMIC CLOCK OPERATING WITH HELIUM 3

(75) Inventors: Matthieu Le Prado, Charmes sur l'Herbasse (FR); Jean-Michel Leger, Villard Bonnot (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 128 days.

(21) Appl. No.: 12/796,615

(22) Filed: Jun. 8, 2010

(65) Prior Publication Data

US 2010/0315173 A1 Dec. 16, 2010

(30) Foreign Application Priority Data

Jun. 11, 2009 (FR) ..................................... 09 53901

(51) Int. Cl.
*H01S 1/06* (2006.01)

(52) U.S. Cl. .......................................... 331/94.1; 331/3

(58) Field of Classification Search ................ 331/3, 17, 331/94.1

See application file for complete search history.

(56) References Cited

U.S. PATENT DOCUMENTS 4,193,029 A * 3/1980 Cioccio et al. ................ 324/301
6,313,628 B1 * 11/2001 Leger ............................ 324/300
2007/0247241 A1 10/2007 Braun et al.

OTHER PUBLICATIONS

French Search Report for French Application No. 09 53901, dated Jan. 15, 2010.
Bollinger, J.J. et al., "Non-Neutral Ion Plasmas and Crystals, Laser Cooling, and Atomic Clocks", Physics of Plasmas, vol. 1, No. 5, pp. 1403-1414, May 1994.
Ertmer, W. et al., "Some Candidate Atoms and Ions for Frequency Standards Research Using Laser Radiative Cooling Techniques", Progress in Quantum Electronics, vol. 8, No. 3-4, pp. 249-255, Jan. 1984.
Itano, Wayne M., "Atomic Ion Frequency Standards", Proceedings of the IEEE, vol. 79, No. 7, pp. 936-941, Jul. 1991.
Swallom, D.W. et al., "An Investigation of the Energy Exchange Mechanisms Involving the $2^3$ *S* Metastable Level in an RF Helium Plasma", Journal of Quantitative Spectroscopy and Radiative Transfer, vol. 14, No. 12, pp. 1185-1193, Dec. 1974.

* cited by examiner

*Primary Examiner* — James E Goodley
(74) *Attorney, Agent, or Firm* — Nixon Peabody LLP

(57) ABSTRACT

An atomic clock comprises helium 3 plasma as measurement medium, which is taken to the plasma state to exploit the metastable state of the material and the levels of the hyperfine structure, the lifetime of which is long and which thus enable an easier measurement than the excitations of gaseous atoms.

10 Claims, 2 Drawing Sheets

ATOMIC CLOCK OPERATING WITH HELIUM 3

CROSS REFERENCE TO RELATED APPLICATIONS OR PRIORITY CLAIM

This application claims priority of French Patent Application No. 09 53901, filed Jun. 11, 2009.

TECHNICAL FIELD

The subject of the invention is an atomic clock operating with helium 3.

BACKGROUND

Atomic clocks comprise a gaseous medium, often alkaline, a device for exciting the atoms of this gas such as a laser, capable of making them jump to higher energy states, and means for measuring a frequential signal emitted by the atoms on returning to the normal energy level, using the photons coming from the laser.

The frequency of the signal of the photons returned by the gas is defined by the formula $\nu=\Delta E/h$, where $\nu$ is the frequency, $\Delta E$ the difference between the energy levels and h Planck's constant, equal to $6.62\times10^{-34}$ J/s.

It is known that this frequency is very stable and that it can thus serve as time reference unit. This is however no longer true when the Zeeman structure of the material is considered: the energy levels then appear as composed of sub-levels corresponding to slightly different states, which are distinguished by their angular momentum index $m_F$, 0 for a reference state of the energy level and −1, −2, etc. or +1, +2, etc. for the others. This is illustrated by FIG. 1 in the case of the element $^{87}Rb$, the breakdown of the first two energy levels (of angular momentums F=1 and F=2) of which is shown.

The energy levels are sensitive to the ambient magnetic field. This sensitivity is low (of the second order) for the sub-level of angular momentum equal to 0, but much higher (of the first order) for the other sub-levels: the transitions made from or up to them produce photons, the frequency of which is variable and thus cannot serve as reference, and only the portion of the signal corresponding to the transition between the two sub-levels of zero angular momentum is exploited for the measurement, which adversely affects its quality. The reference frequency given by the clock is then $fo=E_O/h$, where $E_0$ is the energy difference between the sub-levels at $m_F=0$ of the two states (F=1 and F=2 of the example of FIG. 1).

Alkaline gases have been preferred until now as measurement medium in atomic clocks since they generally comprise stable and excited states each provided with a sub-level with zero angular momentum that thus ensures a measurement at a stable resonance frequency. These bodies nevertheless have the drawback of being able to have several physical states at the ordinary operating conditions and to be chemically very reactive.

If it is possible to maintain the ambient magnetic field at a fixed value, all of the sub-levels are fixed and can contribute to the measurement. Several techniques for stabilising the ambient magnetic field have been developed and disclosed in certain publications, such as American patent US2007/0247241.

SUMMARY

The object of the invention is to improve existing clocks.

It is based on the use as measurement medium of helium 3, but which has been taken to the plasma state by an exciter device separate from the traditional device serving to excite the particles for the measurement.

Only gaseous measurement media are generally considered for measurements in atomic clocks. The use of a plasma, and more specifically that of helium 3, makes it possible to populate a metastable level provided with a hyperfine structure, of high frequency, and thus providing a basis for time measurement appreciable for its precision.

In addition, since helium 3 is chemically inert, no reaction with the surrounding material is to be feared; and since only a reduced portion is usually taken to the plasma state, the greater part remains gaseous and serves as buffer gas in order to limit the impacts between the atoms of helium 3 in the metastable level, said atoms being carriers of the magnetic information.

A synthetic definition of the invention is an atomic clock comprising a cell filled with a measurement medium, a first device (1) for exciting particles of the measurement medium up to a higher energy level, a system (4, 6, 7) collecting a light energy frequency returned by the measurement medium on leaving the higher energy level, said light energy frequency band being exploited to give a time measurement, a device (9) for applying magnetic fields comprising at least one essentially static magnetic field and means for controlling (8) said device (9) to adjust the magnetic fields, characterised in that the measurement medium comprises helium 3 plasma, and a second exciter device (10) is provided to give rise to helium 3 plasma from gaseous helium 3.

The second exciter device may be a "power" radiofrequency wave generator. The expression signifies that the power that this second device establishes in the measurement medium is markedly greater than that which is established by the first exciter device, responsible for the excitation at the origin of the measurement.

The radiofrequency waves may be between 20 MHz and 30 MHz, and their power may be 1 W for a quantity of helium 3 gas of 100 $mm^3$ at a pressure of around 0.1 Torr. It is sufficient in reality to ionise only a part of the measurement medium, having for example a level of 1 part per million of atoms taken to the metastable level, the rest of the helium 3 remaining in the gaseous state and then being without direct utility for the measurement; it serves however as buffer gas to the atoms of helium 3 in the metastable level. The chemical stability of this element has already been mentioned, which makes it all the more interesting as buffer gas given that since it is of the same chemical nature as the element serving for the measurement it does not react chemically with it, which is not the case with alkaline gases, which often have to be mixed with buffer gases to give a stable state. According to a favoured embodiment of the invention, the measurement medium is, consequently, composed exclusively of helium 3, the metastable state being the level $2^3S_1$.

Among other solutions, the first exciter device may comprise a laser beam; and the magnetic fields applied by the device, which are intended for the stabilisation of the energy levels of the measurement medium, may comprise at least one essentially static and controlled magnetic field, and if necessary one or two oscillating magnetic fields perpendicular to the previous field.

BRIEF DESCRIPTION OF THE DRAWINGS

The invention will now be described with reference to the figures.

DETAILED DESCRIPTION

Figure 1:
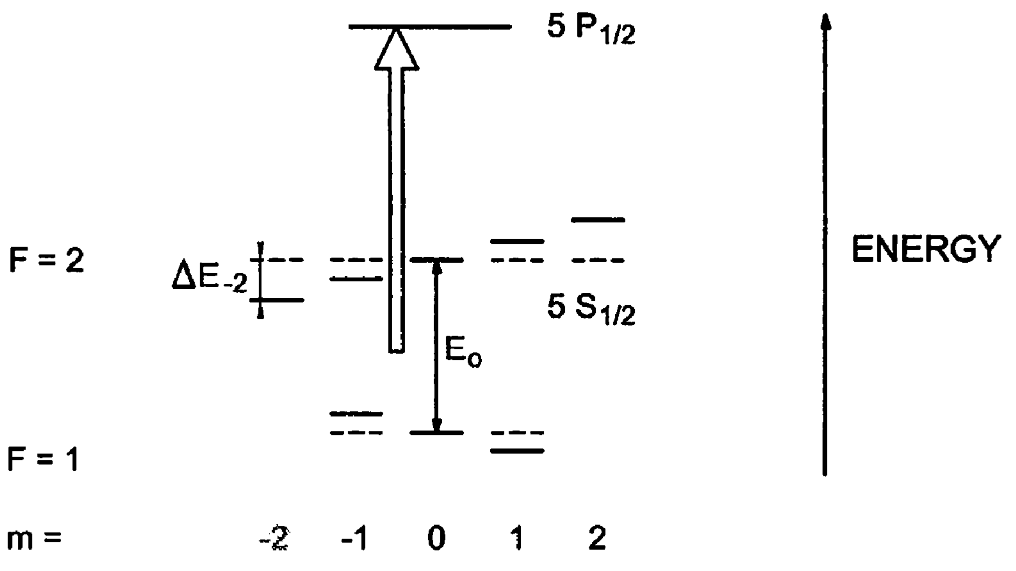
FIG. 1 illustrates an energy diagram of a measurement element in an atomic clock.
Figure 2:
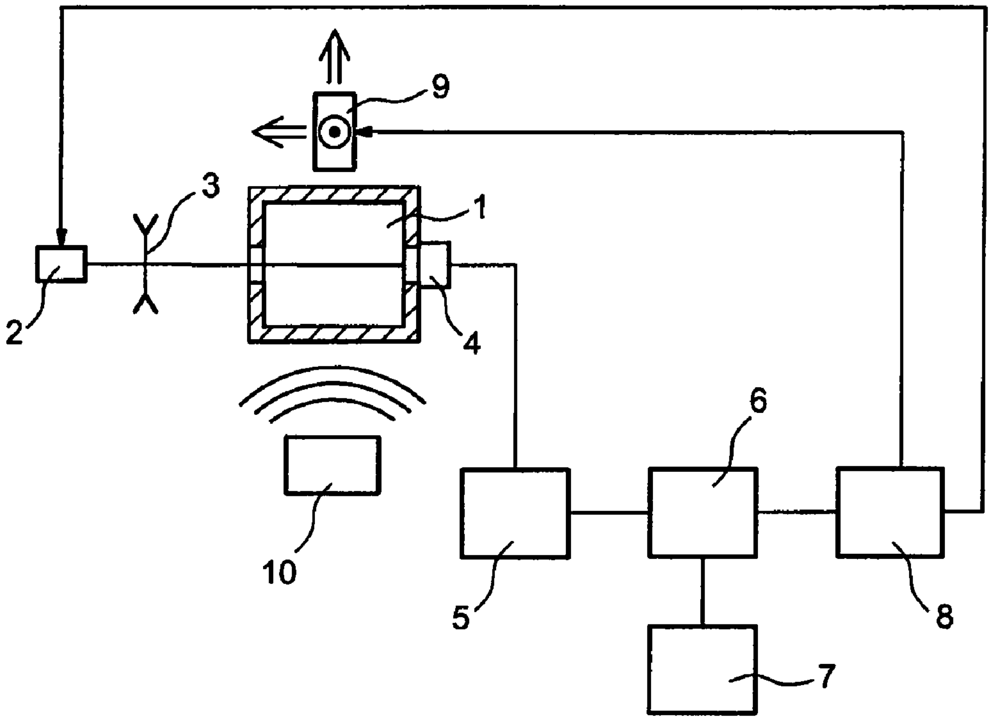
FIG. 2 is a representation of the atomic clock according to the invention.

The core of the clock (FIG. 2) is a cell 1 filled with a measurement medium. An exciter 2 transmits energy to this medium in the form of a flux of photons polarised by a quarter wave plate 3. The exciter may be a laser injecting a light beam to detect the resonances of the medium. A photodetector 4 collects the light energy returned by the excited medium of the cell 1 and transmits a signal to a counting device 5, the photodetector 4 being arranged advantageously in the extension of a laser beam emanating from the exciter 2. A frequency separator 6 collects the signal at the output of the counting device 5 and transmits its results to a device for operating 7 the clock and a control device 8, which governs the exciter 2 and a device for applying a magnetic field 9.

There is also a second excitation device 10 to obtain helium 3 plasma from helium 3 gas.

Herewith several construction components of a possible embodiment of the invention. The first exciter 2 is a laser diode of wavelength 1083 nm for a power of 100 mW, with a pumping current modulated to around 3.37 GHz in order to induce an optical intensity modulation charged with generating the microwave resonance of the hyperfine transition of the helium 3. The quarter wave plate 3 imposes a left circular polarisation for the photons. The cell 1 is filled with helium 3 subjected to a pressure of around 0.1 torr. It is cylindrical, made of Pyrex, and its volume is 100 $mm^3$. The second exciter device 10 comprises two electrodes juxtaposed on either side of the cell 1 which are connected to a power generator of radiofrequencies at 25 MHz (between around 20 MHz and 30 MHz) and 1 W. It creates the helium plasma, which is necessary to populate the metastable level $2^3S_1$ having the hyperfine structure.

The device for applying a magnetic field 9 makes it possible to apply a magnetic field $H_O$ of 500 μT parallel to the laser beam to block the sub-levels at constant energies. A pair of Helmoltz coils is used for this. This magnetic field is controlled to a constant value by the measurement of the Larmor frequency within the hyperfine structure. In this way, variations in the ambient magnetic field are prevented from perturbing the transition of microwaves defining the resonance frequency $f_0$.

The device for applying a magnetic field 9 again generates a component of oscillating magnetic field at low frequency, applied perpendicular to the static magnetic field and which is controlled thanks to the control device 8 at the Zeeman transition at around 12 MHz. This oscillating field makes it possible to induce a resonance within Zeeman sub-levels, which will give the abovementioned measurement to evaluate the resulting ambient magnetic field and control it to a constant value.

Since helium 3 is not provided with sub-levels with zero angular momentum index, it is necessary to make the device operate at constant magnetic field, which may be obtained by a controlled artificial field with or without magnetic shielding. The control of the magnetic field may be accomplished in a scalar or vectorial manner by the Larmor or vectorial frequency by a zero total magnetic field search.

The device for applying a magnetic field 9 may at the same time generate the magnetic field serving for the resonance measurement if it is composed of controlled triaxial coils.

In an improved conception, the device for applying a field 9 emits magnetic fields at radiofrequencies of pulsations noted Ω and ω, which are mutually perpendicular and of direction dependent on the polarisation (for example perpendicular to the light rays emitted by the exciter 2 in the case of a circular polarisation).

Figure 3:
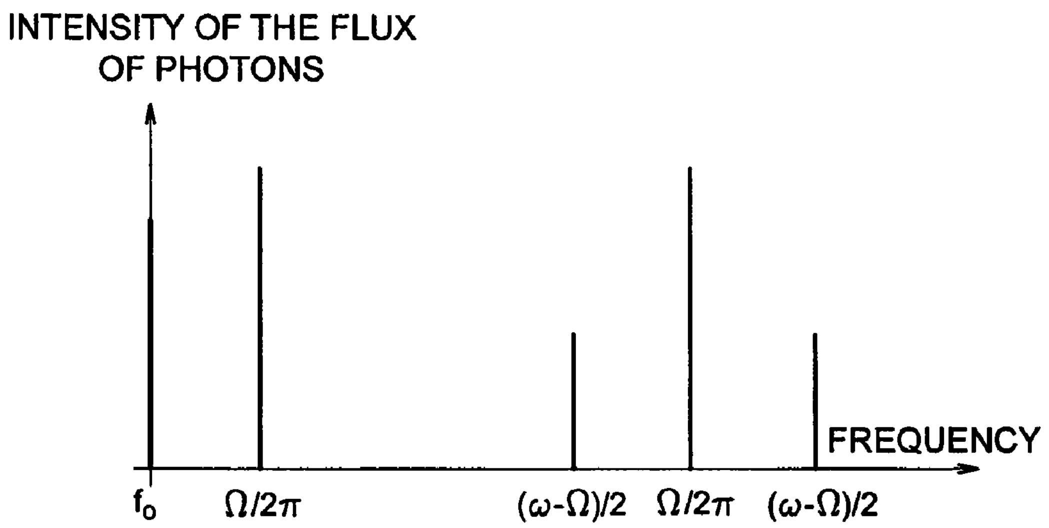
FIG. 3 and FIG. 4 illustrate a stabilisation magnetic field control embodiment.
Figure 4:
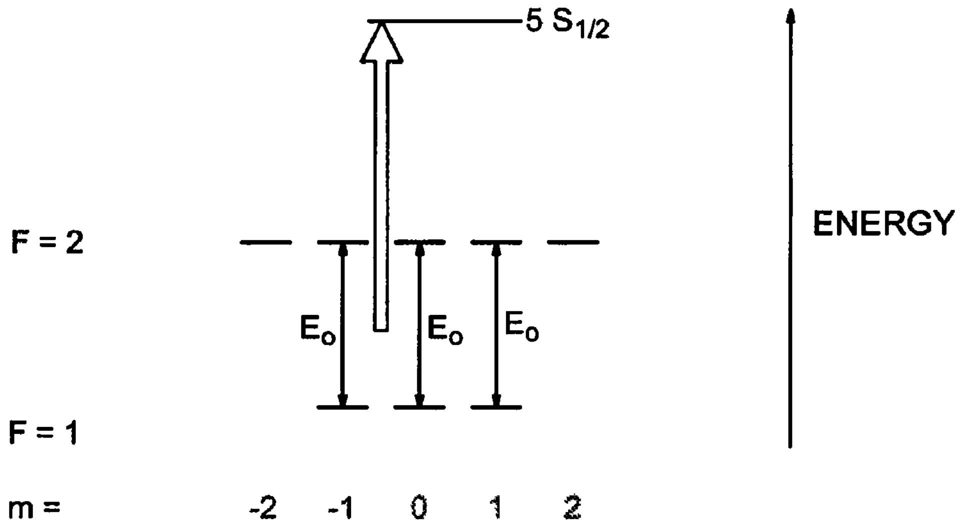

Reference is made to FIG. 3. The signal coming from the counting device 5 comprises several light rays, and firstly one which is at the useful frequency $f_0$ corresponding to the restitution of the photons by the gaseous medium and which gives the reference to the time measurement. It again shows spectral lines at the frequencies $\Omega/2\pi$, $(\omega-\Omega)/2\pi$, $\omega/2\pi$, and $(\omega+\Omega)/2\pi$. These spectral lines appear for magnetic fields of low values, well below $1/\delta\cdot T_R$, where $T_R$ is the relaxation time of the sub-levels and γ is their gyromagnetic ratio, characteristic of the chemical element excited. They correspond to resonances between the sub-levels. Their amplitude is proportional to the ambient magnetic field. It is in keeping with this method of control to apply a magnetic field for compensating the essentially static ambient magnetic field, but which is varied in a continuous manner in amplitude and in direction if necessary, so that the amplitude of these lines is reduced as much as possible, which signifies that the compensation field has balanced out the ambient magnetic field. FIG. 4 then shows that the sub-levels of each principal level are at a same energy value, so that the photons returned by the gaseous medium are all at the useful frequency $f_0$: the corresponding spectral line appears in the form of a much sharper and higher peak, the detection of which is thus facilitated. It becomes conceivable to omit the traditional magnetic shielding of atomic clocks; however, since the magnetic shielding filters the electric field by skin effect, an electric shielding is advantageously added so as not to disrupt the energy levels of the atoms if the magnetic shielding is eliminated. The amplitudes of the radiofrequency fields are advantageously chosen to maximise the amplitude of the spectral resonance lines (before the application of the compensation static field). It is recommended to approximately respect the equalities $\gamma H\omega/\omega=1$ and $\gamma H\Omega/\Omega=1$, where Hω and HΩ are the amplitudes of the radiofrequency fields of pulsations ω and Ω. Advantageously, the device for applying the magnetic field 9 applies at the same time the substantially static compensation magnetic field and the radiofrequency magnetic fields.

It may consist of triaxial coils, or three mutually concentric monoaxial coils. The control is accomplished by any known material comprising a computing unit. The coils are current or voltage driven. The excitation to the resonance frequency $f_0$ is accomplished by an amplitude modulation of the laser diode at the frequency $f_0/2$ or by a microwave cavity resonating at the frequency $f_0$. An exciter comprising two lasers, the difference in frequency of which is $f_0$, may also be envisaged.

Since helium 3 is not provided with sub-levels with zero angular momentum index, it is necessary to make the device operate at constant magnetic field, which may be obtained by a controlled artificial field with or without magnetic shielding. The control of the magnetic field may be accomplished in a scalar or vectorial manner by the Larmor or vectorial frequency by a zero total magnetic field search.

The device for applying a magnetic field 9 may at the same time generate the magnetic field serving for the measurement of the resonance if it is composed of controlled triaxial coils.

The instrument measuring the laser flux may be a photodiode of InGaAs type. This embodiment, comprising a device for stabilising the magnetic field, does not comprise magnetic shielding. However, it is also possible to use a magnetic shielding in addition to the device for controlling the magnetic field as described previously. The magnetic shielding may be composed for example of a cylinder of soft iron and a cylinder of overlapping μ metal.

The exciter 2 could comprise a lamp or a VCSEL (for variation capacity surface emitting light). In the absence of a device for stabilising the ambient magnetic field, the excitation to the resonance frequency could also be brought about by a microwave resonating cavity or by two lasers, the frequency difference of which is the resonance frequency.

The invention claimed is:

1. Atomic clock comprising a cell filled with a measurement medium, a first device for exciting particles of the measurement medium up to a higher energy level, a system collecting a light energy frequency returned by the measurement medium on leaving the higher energy level, said light energy frequency being exploited to give a time measurement, a device for applying magnetic fields comprising at least one essentially static magnetic field and means for controlling said device to adjust the magnetic fields, characterised in that the measurement medium comprises helium 3 plasma, and it is provided with a second exciter device to give rise to helium 3 plasma from gaseous helium 3.

2. Atomic clock according to claim 1, characterised in that the second exciter device is a power radiofrequency wave generator.

3. Atomic clock according to claim 2, characterised in that the radiofrequency waves are between 20 MHz and 30 MHz.

4. Atomic clock according to claim 2, characterised in that the radiofrequency waves have a power of 1 W for a quantity of helium 3 of 100 $mm^3$ at a pressure of around 0.1 torr.

5. Atomic clock according to claim 1, characterised in that the higher energy level, from which the measurement medium returns the light energy frequency exploited to give the time measurement, is the metastable level $2^3S_1$.

6. Atomic clock according to claim 5, characterised in that the measurement medium is composed exclusively of helium 3, having a level of 1 part per million of atoms taken to the metastable level, when the second exciter device operates.

7. Atomic clock according to claim 1, characterised in that the first exciter device comprises a laser beam, and the magnetic fields applied by the device comprise at least one oscillating magnetic field.

8. Atomic clock according to claim 7, characterised in that the magnetic fields applied by the device comprise two mutually perpendicular oscillating magnetic fields.

9. Atomic clock according to claim 7, characterised in that the essentially static magnetic field is precisely oriented in relation to the oscillating magnetic field or to the oscillating magnetic fields.

10. Atomic clock according to claim 1, characterised in that it comprises a magnetic shielding that surrounds it.

* * * * *